US010627017B2

(12) United States Patent
Juzak et al.

(10) Patent No.: US 10,627,017 B2
(45) Date of Patent: Apr. 21, 2020

(54) REINFORCEMENT ELEMENT FOR THE SECURING OF A MIXING VALVE TO A MOUNTING RAIL

(71) Applicant: J. van Walraven Holding B.V., Mijdrecht (NL)

(72) Inventors: Marek Juzak, Mijdrecht (NL); Frank Nijdam, Zeewolde (NL)

(73) Assignee: J. van Walraven Holding B.V., Mijdrecht (NL)

( * ) Notice: Subject to any disclaimer, the term of this patent is extended or adjusted under 35 U.S.C. 154(b) by 0 days.

(21) Appl. No.: 16/156,241

(22) Filed: Oct. 10, 2018

(65) Prior Publication Data
US 2019/0113157 A1 Apr. 18, 2019

(30) Foreign Application Priority Data
Oct. 17, 2017 (NL) .................................... 2019745

(51) Int. Cl.
*F16M 11/00* (2006.01)
*F16L 3/24* (2006.01)
*F16B 5/06* (2006.01)

(52) U.S. Cl.
CPC .............. *F16L 3/24* (2013.01); *F16B 5/0685* (2013.01)

(58) Field of Classification Search
CPC . E03C 1/042; Y10T 137/698; Y10T 137/6969
See application file for complete search history.

(56) References Cited

U.S. PATENT DOCUMENTS

| | | | | |
|---|---|---|---|---|
| 3,435,467 A * | 4/1969 | Flegel | ................... | E03D 11/143 4/252.2 |
| 6,422,520 B1 | 7/2002 | Hand | | |
| 7,191,794 B2 * | 3/2007 | Hodges | ................... | E03C 1/042 137/343 |
| 8,813,421 B2 * | 8/2014 | Schaeffer | ................ | A01G 17/06 47/44 |
| 9,464,426 B1 * | 10/2016 | Schaetzke | ................ | E03C 1/01 |

* cited by examiner

*Primary Examiner* — Amy J. Sterling
(74) *Attorney, Agent, or Firm* — Hoffmann & Baron, LLP

(57) ABSTRACT

A reinforcement element includes a mounting plate with two plate halves spaced apart by a centre portion. In a first use mode, the reinforcement element is secured onto a mounting rail. The centre portion of the reinforcement element engages the mounting rail, and a mixing valve is secured to the mounting plate via a pattern front face mixing valve securing holes. A body of the mixing valve is at least partially supported by the plate halves of the mounting plate. In a second use mode, the mixing valve is secured to the reinforcement element via a pattern back face mixing valve securing holes, while the bottom plate of the centre portion at least partially engages and supports a body of the mixing valve.

10 Claims, 9 Drawing Sheets

REINFORCEMENT ELEMENT FOR THE SECURING OF A MIXING VALVE TO A MOUNTING RAIL

CROSS-REFERENCE TO RELATED APPLICATIONS

This application claims the benefit of Netherlands Application No. NL 2019745, filed Oct. 17, 2017, the contents of which is incorporated by reference herein.

FIELD OF THE INVENTION

The present invention relates to the securing of a mixing valve onto a mounting rail.

BACKGROUND OF THE INVENTION

Commonly, when installing a mixing valve, e.g. of a shower or a bath, on a mounting rail, a mounting rail of a desired length is installed between two columns; the columns and the mounting rail define a frame body that is arranged behind a false wall. The mixing valve is then directly installed onto the mounting rail, e.g. with two self-tapping screws. However, such a connection between the mixing valve and the mounting rail may not always be sufficiently secure and stable.

U.S. Pat. No. 6,422,520 discloses a universal mounting bracket configured to mount a prepared shower mixing valve directly to the reverse side of a fiberglass shower wall. The mounting bracket is attached to the fiberglass wall with a plurality of U-shaped spring clips that snap into a plurality of rectangular apertures located on the bracket body. While the universal mounting bracket of U.S. Pat. No. 6,422,520 improves the connection between the wall and the shower mixing valve, a need for an even more secure connection is felt.

SUMMARY OF THE INVENTION

The invention relates to a reinforcement element for the securing of a mixing valve to a mounting rail, the mixing valve being of the type that receives at least three conduits. The reinforcement element comprises a mounting plate comprising a first plate half and a second plate half that are spaced apart by a centre portion and are arranged in a common plane. The centre portion comprises two flanges and a bottom plate connected to an end of the flanges, each of the flanges being connected to a respective plate half of the mounting plate with an end remote from the bottom plate, and the bottom plate being arranged parallel to the common plane of the first plate half and the second plate half, lying recessed from said plane. The first and second plate halves of the mounting plate have a front face and a back face opposite the front face, the back face being the face from which the centre portion projects. The reinforcement element has a pattern of holes, including at least one pattern of reinforcement element securing holes to allow the reinforcement element to be secured onto the mounting rail, and at least a first, a second, and a third pattern of mixing valve securing holes, each pattern of mixing valve securing holes allowing a particular mixing valve to be secured onto the reinforcement element in a predefined manner, such that the reinforcement element can be mated with at least three different embodiments of mixing valves. The patterns of mixing valve securing holes include at least one pattern of front face mixing valve securing holes, suited for use when the front face of the mounting plate faces away from the mounting rail, and at least one pattern of back face mixing valve securing holes, suited for use when the back face of the mounting plate faces away from the mounting rail. The reinforcement element has a first use mode and a second use mode. In the first use mode, the reinforcement element is secured onto the mounting rail via one of the patterns of the reinforcement element securing holes, the centre portion engaging the mounting rail, the front face facing away from the mounting rail, and the mixing valve being secured to the mounting plate via a pattern of the front face mixing valve securing holes, while a body of the mixing valve is at least partially supported by the plate halves of the mounting plate. In the second use mode, the reinforcement element is secured onto the mounting rail via another one of the patterns of the reinforcement element securing holes, the plate halves of the mounting plate at least partially engaging the mounting rail, the back face facing away from the mounting rail, and the mixing valve being secured to the reinforcement element via one of the patterns of the back face mixing valve securing holes, while the bottom plate of the centre portion at least partially engages and supports a body of the mixing valve. To secure a particular embodiment of mixing valve onto the reinforcement element, one pattern of the at least three patterns of mixing valve securing holes is used, and either the first use mode or the second use mode of the reinforcement element is used.

According to the invention, the reinforcement element provides stable and secure plate halves or a stable and secure centre portion on which the mixing valve, while being secured to the mounting rail, rests. This resting of the mixing valve onto the mounting plate improves the stability and secureness of the mixing valve in an installed state. Once installed, the mixing valve is not only connected to the mounting rail via a pattern, e.g. a pair, of mixing valve securing holes, but is additionally stabilized by the mounting plate of the reinforcement element. This reinforcement element, in turn, is also secured to the mounting rail via a further pattern, e.g. a pair, of reinforcement element securing holes. Hence, once installed, the mixing valve may be (indirectly) secured to the mounting rail with four screws or fastening elements, while the mixing valve itself only comprises two securing holes. Two screws may secure the mixing valve to the reinforcement element, while the reinforcement element may be secured to the mounting rail with two additional screws. Furthermore, as the body of the mixing valve rests against the plate halves of the mounting plate or against the centre portion of the mounting plate, the mixing valve is more stably supported by the mounting rail, compared to known solutions.

Typically, different embodiments (brands) of mixing valves, each have securing tabs with securing holes that are arranged at different locations with respect to a body of the mixing valve. The locations of these securing tabs typically varies between different brands. To allow the reinforcement element to be compatible with as many different embodiments of mixing valves as possible, i.e. with as many different brands as possible, and allow the reinforcement element to be as universal as possible, the reinforcement element comprises at least three, up to seven or more, mutually different patterns of mixing valve securing holes, to allow the securing of a mixing valve to the reinforcement element. For example, the reinforcement element may have at least seven mutually different patterns of mixing valve securing holes.

By having a first use mode and a second use mode, in which effectively different sides of the reinforcement element are used, this compatibility with as much embodiments (brands) of mixing valves as possible is further increased.

With respect to the plate halves, the bottom plate lies recessed from and parallel to the common plane of said plate halves. That is, there is a height difference between the plate halves and the bottom plate. In the first use mode, the plate halves are arranged on a distance in front of the rail, while in the second use mode, the bottom plate is arranged on a distance in front of the rail. Different embodiments (brands) of mixing valves typically have a height difference between a body and securing tabs thereof. By providing a height difference between the bottom plate and the plate halves, different types of mixing valves can be supported and stabilized by the reinforcement element.

For example, the mounting plate may have at least five mutually different patterns of front face mixing valve securing holes, while the mounting plate may have at least two further mutually different patterns of back face mixing valve securing holes.

In a possible embodiment, a pattern of reinforcement element securing holes and/or a pattern of mixing valve securing holes includes at least two holes, such as two holes, three holes, or four holes.

In a possible embodiment, a single hole forms a part of both the first pattern of mixing valve securing holes and the second pattern of mixing valve holes. For example, the first pattern of mixing valve holes and the second pattern of mixing valve holes may each be a pair of holes. The first hole of both pairs of holes may then be the same hole, while the second holes of the pairs of holes may be different holes. A hole forming a part of multiple patterns of holes reduces the required amount of holes, while maintaining or increasing the amount of patterns. Further, having one or more holes that each form a part of multiple patterns of holes increases the stiffness of the reinforcing element for a given amount of patterns of holes.

One particular hole may be a part of two or more mutually different patterns of mixing valve holes, or may be a part of two or more mutually different patterns of reinforcement valve securing holes, or may be a part of one or more patterns of mixing valve securing holes and one or more patterns of reinforcement element securing holes.

In a possible embodiment, all mixing valve securing holes and all reinforcement element securing holes are mutually different holes.

In a possible embodiment, the pattern of reinforcement element securing holes includes at least one pattern of front face reinforcement element securing holes, suited for use when the front face of the mounting plate faces away from the mounting rail, and at least one pattern of back face reinforcement element securing holes, suited for use when the back face of the mounting plate faces away from the mounting rail. Notwithstanding the possible presence of back face reinforcement element securing holes and front face reinforcement securing holes, one or more holes may be used as both back face and front face reinforcement element securing holes.

At least one pattern of front face reinforcement element securing holes may be arranged in the bottom plate of the centre portion, while at least one pattern of back face reinforcement element securing holes may be arranged in the plate halves of the mounting plate.

In a possible embodiment, when the reinforcement element is used in the first use mode thereof, the longitudinal axis of the centre portion is aligned parallel to the mounting rail.

In a possible embodiment, when the reinforcement element is used in the second use mode thereof, the longitudinal axis of the centre portion is arranged at an angle of from 70° to 110° to the longitudinal axis of the mounting rail. For example, the longitudinal axis of the centre portion may be arranged perpendicular to the longitudinal axis of the mounting rail.

Hence, in possible embodiments, in the second use mode, the reinforcement element is oriented with respect to an axis perpendicular to the common plane of the plate halves at an angle of from 80° to 100° compared to the first use mode. This, advantageously, may increase the number of patterns of mixing valve securing holes that can be applied onto the reinforcement element.

In a possible embodiment, mixing valve type indication marks are provided near the mixing valve securing holes to ease the installation of the mixing valve for an installer. Preferably, the mixing valve indication marks correspond to brand names.

In a possible embodiment, orientation indication marks are provided on the plate halves of the mounting plate to ease the installation of the mixing valve for an installer. The orientation indication marks may for example indicate in which position a particular side of the reinforcement element must be installed.

The invention further relates to a method for the securing of a mixing valve to a mounting rail wherein use is made of a reinforcement element as described in the above, the method comprising the steps of:

securing the reinforcement element onto the mounting rail by providing one or more male fastening elements that extends through a pattern of the reinforcement element securing holes and into the mounting rail;

securing the mixing valve onto the reinforcement element by providing one or more male fastening elements that extends through a pattern of the mixing valve securing holes and into the mounting rail.

The reinforcement element and the method will be explained in more detail with reference to the drawings.

DETAILED DESCRIPTION OF THE INVENTION

Figure 1:
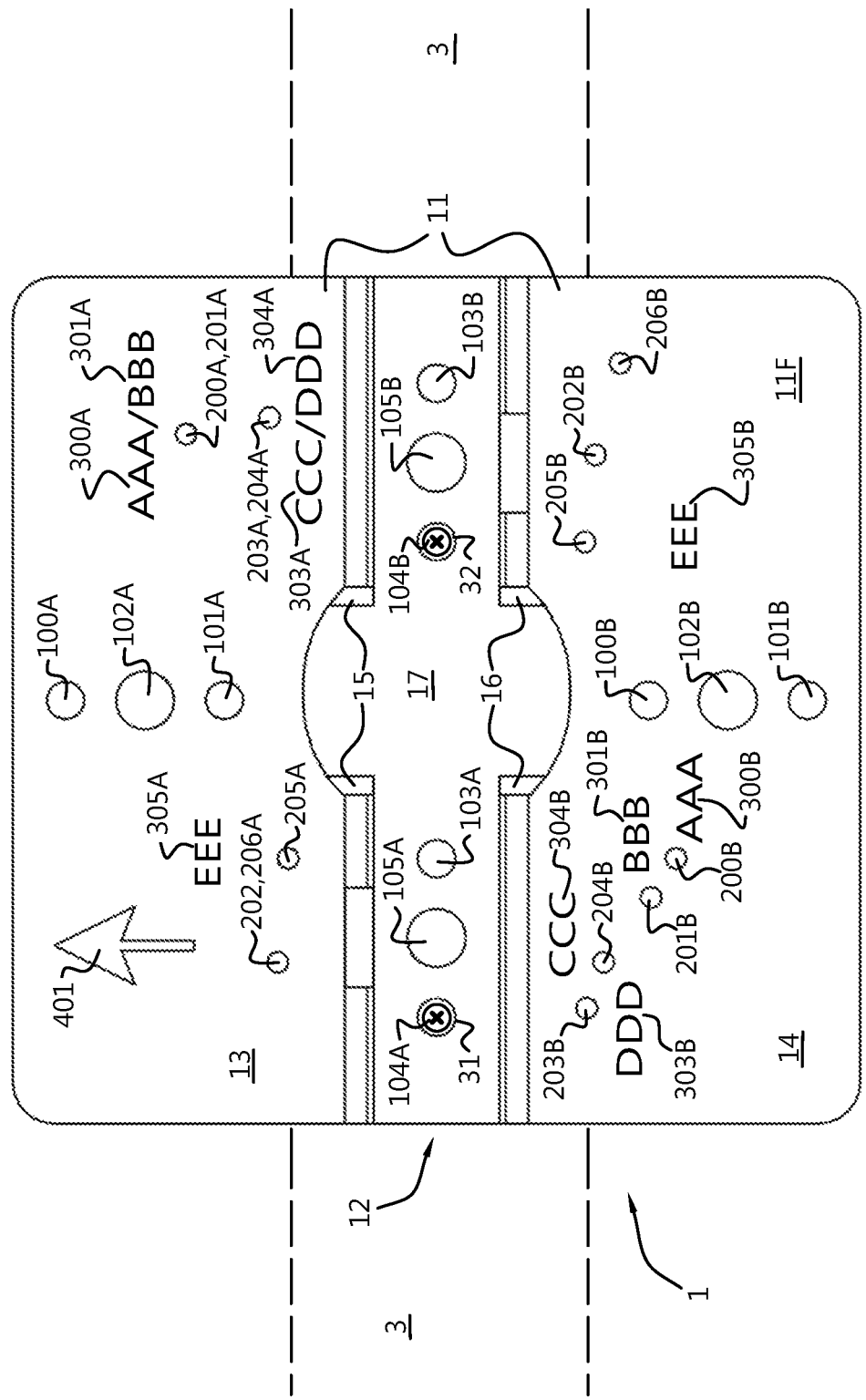
FIG. 1 schematically shows a front view of an embodiment of the reinforcement element according to the invention.
Figure 2:
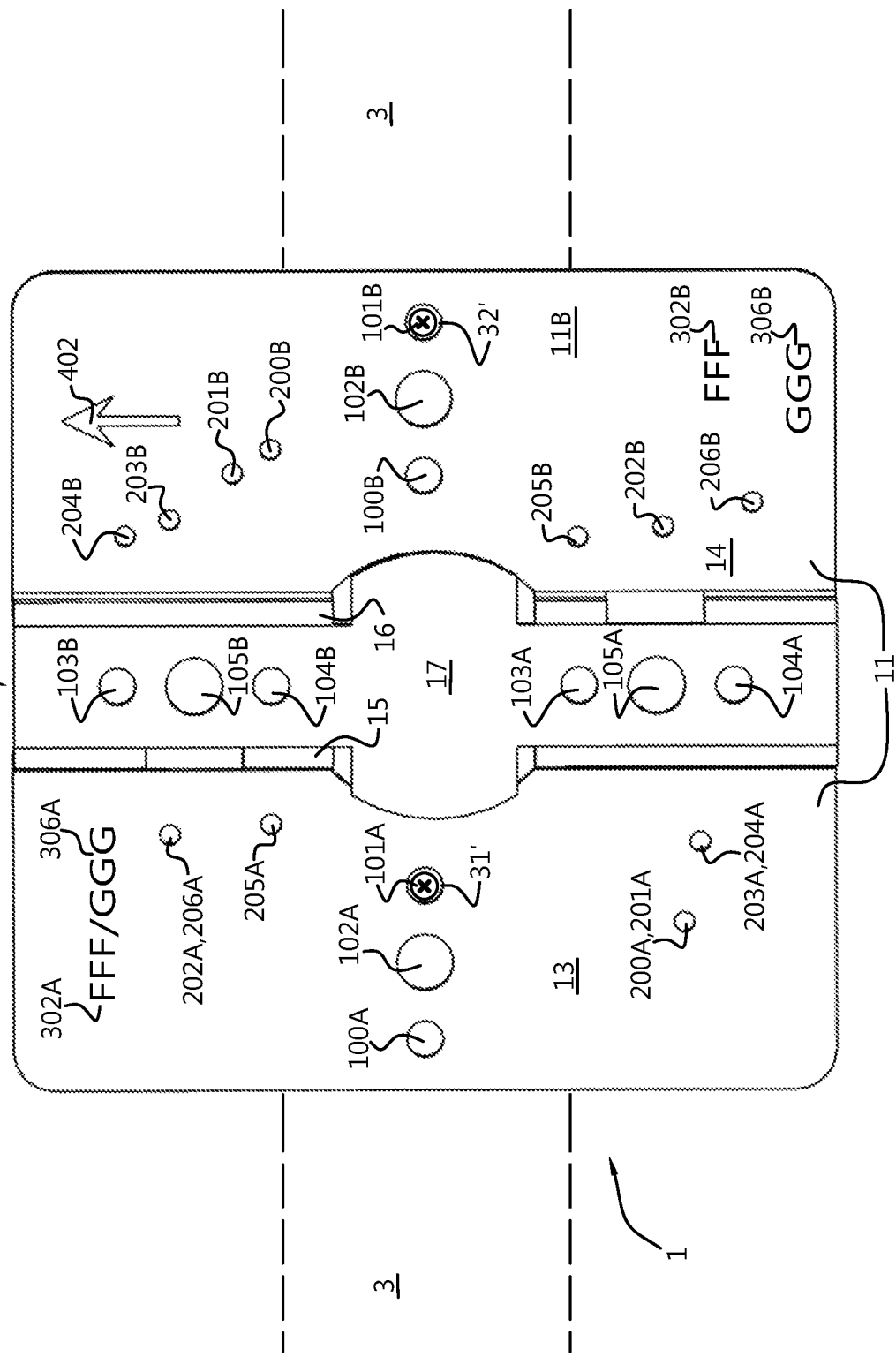
FIG. 2 schematically shows a rear view of the reinforcement element of FIG. 1.
Figure 3:
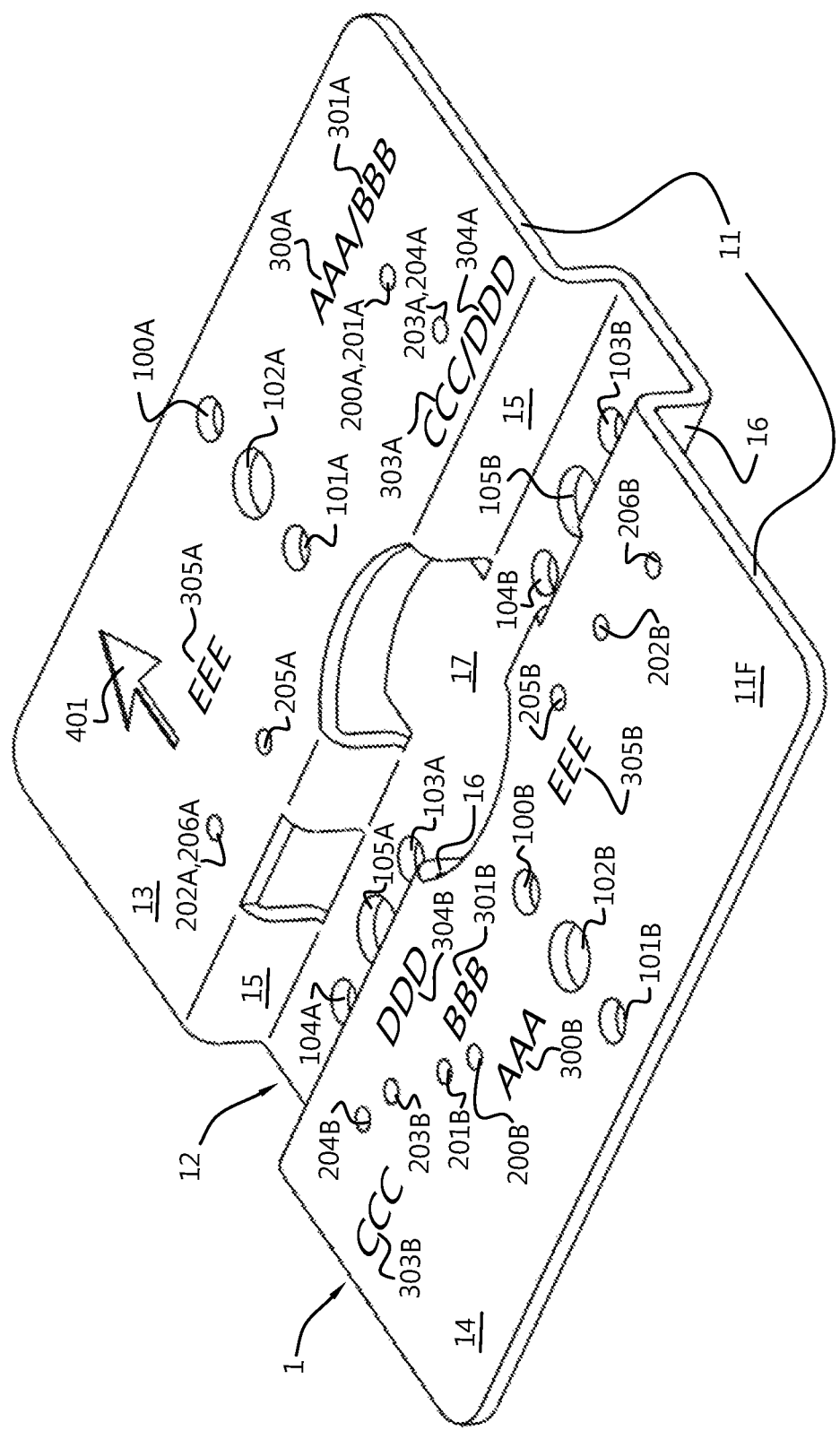
FIG. 3 schematically shows an isometric view of the reinforcement element of FIG. 1.

With reference to FIGS. 1-3, a reinforcement element 1 for the securing of a mixing valve, e.g. a shower valve, to a mounting rail 3 is shown. FIG. 1 shows a front view of said reinforcement element 1, FIG. 2 shows a rear view of the reinforcement element 1, and FIG. 3 shows an isometric view from a front face 11F of the reinforcement element 1.

The reinforcement element 1 comprises a mounting plate 11 that comprises a first plate half 13 and a second plate half 14 which are spaced apart by a centre portion 12 and are generally arranged in a common plane. The plane spanned by the first plate half 13 may be inclined about an absolute value of up to 30 degrees with respect to the plane spanned by the second plate half 14. In other words, the first plate half 13 and the second plate half 14 may extend at angles of between 150 degrees and 210 degrees with respect to each other. Preferably, the plate halves 13, 14 extend at an angle of approximately 180 degrees with respect to each other.

The first 13 and second 14 halves of the mounting plate 11 have a front face 11F, shown in FIGS. 1 and 3, and a back face 11B, shown in FIG. 2, opposite the front face 11F, the back face 11B being the face from which the centre portion 12 projects. The front face 11F of the mounting plate 11 is the face with respect to which the centre portion 12 is arranged recessed, or rearwards/aft, of the plate halves 13, 14, while the back face 11B of the mounting plate 11 is the face with respect to which the centre portion 12 is arranged projecting, or in front, of the plate halves 13, 14.

The centre portion 12 comprises two flanges 15, 16 and a bottom plate 17 connected to an end of the flanges 15, 16, wherein the bottom plate 17 may be arranged substantially perpendicular with respect to the flanges 15, 16. Each of the flanges 15, 16 is connected to a respective plate half 13, 14 of the mounting plate 11 with an end remote from the bottom plate 17, wherein the bottom plate 17 is arranged substantially parallel to the common plane of the first plate half 13 and the second plate half 14, and lies recessed from said plane. The bottom plate 17 is displaced with respect to said plane in a direction perpendicular thereto. The plane spanned by the bottom plate 17 may be inclined at an absolute value of up to 30 degrees with respect to the plane spanned by the first plate half 13 and/or the second plate half 14. One may say that the centre portion 12, i.e. the flanges 15, 16 and the bottom plate 17, form a gutter with respect to the mounting plate 11, as is visible most clearly in FIG. 3.

As is visible in FIGS. 1-3, the reinforcement element 1 has a pattern of holes. The pattern of holes includes reinforcement element securing holes 100A, 100B, 101A, 101B, 102A, 102B, 103A, 103B, 104A, 104B, 105A, 105B, that allow the reinforcement element 1 to be secured onto the mounting rail 3, and mixing valve securing holes 200A, 200B, 201A, 201B, 202A, 202B, 203A, 203B, 204A, 204B, 205A, 205B, 206A, 206B, that allow a particular mixing valve to be secured onto the reinforcement element 1 in a predefined manner.

In the shown embodiment, the reinforcement element has six patterns 100, 101, 102, 103, 104, 105 of reinforcement element securing holes, wherein each pattern is defined by a pair of holes, and wherein each hole of a pair is respectively marked A or B. That is, the first pair of reinforcement element securing holes is indicated by reference numerals 100A and 100B, etc. It is however conceived that a pattern of reinforcement element securing holes may be defined by more (e.g. three holes or more), or less (e.g. a single hole) holes.

More specifically, the patterns of reinforcement element securing holes 100A, 100B, 101A, 101B, 102A, 102B, 103A, 103B, 104A, 104B, 105A, 105B include three, i.e. at least one, patterns of front face reinforcement element securing holes 103A, 103B, 104A, 104B, 105A, 105B, suited for use when the front face 11F of the mounting plate 11 faces away from the mounting rail 3, and three, i.e. at least one, patterns of back face reinforcement element securing holes 100A, 100B, 101A, 101B, 102A, 102B, suited for use when the back face 11B of the mounting plate 11 faces away from the mounting rail 3.

The front face reinforcement element securing holes 103A, 103B, 104A, 104B, 105A, 105B are here arranged in the bottom plate 17 of the centre portion 12, while the back face reinforcement element securing holes 100A, 100B, 101A, 101B, 102A, 102B are arranged in the plate halves 13, 14 of the mounting plate 11.

As may be observed from FIGS. 1-3, some of the reinforcement element securing holes may be larger than other reinforcement element securing holes. More in particular, reinforcement element securing holes 102A, 102B, 105A and 105B have a larger diameter than reinforcement element securing holes 100A, 100B, 101A, 101B, 103A, 103B, 104A and 104B. For example, the reinforcement element securing holes having a smaller diameter may allow the securing of the reinforcement element onto the mounting rail with screws, while the reinforcement element securing holes having a larger diameter may allow the securing of the reinforcement element onto the mounting rail with a threaded rod that extends from the rail towards the reinforcement element and a nut that is threaded onto the threaded rod. A threaded body of a screw is typically smaller in diameter than a threaded rod on which a nut is threaded, hence the difference in hole diameter.

The mixing valve securing holes include at least at least a first 200A, 200B, a second 201A,

201B, and a third 202A, 202B pattern of mixing valve securing holes such that the reinforcement element 1 can be mated with at least three different embodiments (brands) of mixing valves. Here, the reinforcement element 1 has seven mutually different patterns of mixing valve securing holes, such that the reinforcement element 1 can be mated with seven different embodiments (brands) of mixing valves.

Some of the mixing valve securing holes are suited for use when the front face 11F of the mounting plate 11 faces away from the mounting rail 3. These holes are defined as front face mixing valve securing holes 200A, 200B, 201A, 201B, 203A, 203B, 204A, 204B, 205A, 205B. The embodiments of FIGS. 1-3 include five mutually different patterns of such front face mixing valve securing holes 200A, 200B, 201A, 201B, 203A, 203B, 204A, 204B, 205A, 205B, here all arranged in the mounting plate 11 of the reinforcement element 1.

Other mixing valve securing holes are suited for use when the back face 11B of the mounting plate 11 faces away from the mounting rail 3. These holes are defined as back face mixing valve securing holes 202A, 202B, 206A, 206B. The embodiments of FIGS. 1-3 include two mutually different patterns of such back face mixing valve securing holes 202A, 202B, 206A, 206B, here all arranged in the mounting plate 11 of the reinforcement element 1.

One particular mixing valve securing hole, in the shown embodiment, is either a front face mixing valve securing hole, only suited for use when the front face of the mounting plate faces away from the rail, or a back face mixing valve securing hole, only suited for use when the back face of the mounting plate faces away from the rail. However, embodiments are conceived, and within the scope of the invention, wherein a particular hole, or particular holes, are both suited for use when the front face of the mounting plate faces away from the rail as well as when the back face of the mounting plate faces away from the rail.

One particular hole, in the shown embodiment, is either a mixing valve securing hole, only suited to mount a mixing valve to the reinforcement element, or a reinforcement element securing hole, only suited to mount the reinforcement element to the mounting rail. That is, the mixing valve securing holes 200A, 200B, 201A, 201B, 202A, 202B, 203A, 203B, 204A, 204B, 205A, 205B, 206A, 206B and the reinforcement element securing holes 100A, 100B, 101A, 101B, 102A, 102B, 103A, 103B, 104A, 104B, 105A, 105B are mutually different holes. However, embodiments are conceived, and within the scope of the invention, where a particular hole, or particular holes, are both suited to mount a mixing valve to the reinforcement element as well as to mount the reinforcement element to the mounting rail, depending on the particular application of the reinforcement element and the embodiment of mixing vale used.

It is noted that, in the present embodiment, each pattern of mixing valve securing holes 200A, 200B, 201A, 201B, 202A, 202B, 203A, 203B, 204A, 204B, 205A, 205B, 206A, 206B includes two holes, each hole of a pair respectively being marked A or B. That is, the first pair of mixing valve securing holes is indicated by reference numerals 200A and 200B, etc. It is however conceived that a pattern of mixing valve securing holes may be defined by more (e.g. three holes or more), or less (e.g. a single hole) holes.

Further visible in FIGS. 1-3 is that some of the mixing valve securing holes form a part of multiple, here two, patterns of mixing valve securing holes. More specifically, hole 200A, 201A forms a part of both the first pattern 200 and the second pattern 201 of mixing valve securing holes; hole 203A, 204A forms a part of both the third pattern 203 and the fourth pattern 204 of mixing valve securing holes; and hole 202A, 206A forms a part of both the second pattern 202 and the sixth pattern 206 of mixing valve securing holes.

The reinforcement element 1 has a first use mode and a second use mode.

In the first use mode, the reinforcement element 1 is secured onto the mounting rail via one of the patterns of the reinforcement element securing holes 100A, 100B, 101A, 101B, 102A, 102B, 103A, 103B, 104A, 104B, 105A, 105B, the centre portion 12, here the bottom plate 17 of the centre portion 12, engaging the mounting rail 3, the front face 11F facing away from the mounting rail 3, and the mixing valve (not shown) being secured to the mounting plate 11 via a pattern of the front face mixing valve securing holes 200A, 200B, 201A, 201B, 203A, 203B, 204A, 204B, 205A, 205B, and a body of the mixing valve is at least partially supported by the plate halves 13, 14 of the mounting plate 11.

In the shown embodiment, the reinforcement element 1 is secured onto the mounting rail with screws 31, 32 via a pattern of the front face reinforcement element securing holes 104A, 104B in the first use mode.

In the shown embodiment, a space may be present between the plate halves 13, 14 of the mounting plate 11 and the mounting rail 3.

In the shown embodiment, in the first use mode thereof, the longitudinal axis of the centre portion 12 is aligned parallel to the mounting rail 3.

In the second use mode, the reinforcement element 1 is secured onto the mounting rail 3 via one of the patterns of the reinforcement element securing holes 100A, 100B, 101A, 101B, 102A, 102B, 103A, 103B, 104A, 104B, 105A, 105B, the plate halves 13, 14 of the mounting plate 11 at least partially engaging the mounting rail 3, the back face 11B facing away from the mounting rail 3, and the mixing valve (not shown) being secured to the reinforcement element 1 via one of the patterns of the back face mixing valve securing holes 202A, 202B, 206A, 206B, while the bottom plate 17 of the centre portion 12 at least partially engages and supports a body of the mixing valve.

More specifically, with reference to FIG. 2, the reinforcement element 1 is secured onto the mounting rail 3 with screws 31', 32' via a pattern of the back face reinforcement element securing holes 101A, 101B in the second use mode.

In the shown embodiment, a space may be present between the bottom plate 17 of the centre portion 12 and the mounting rail 3.

In the shown embodiment, in the second use mode thereof, the longitudinal axis of the centre portion 12 is arranged at an angle of from 70° to 110°, e.g. substantially perpendicular, to the longitudinal axis of the mounting rail 3.

Comparing FIG. 1 to FIG. 2, it may be observed that, in the second use mode, the reinforcement element 1 is oriented with respect to an axis perpendicular to the common plane of the plate halves 13, 14 at an angle of from 80° to 100° compared to the first use mode.

It is noted that, to secure a particular embodiment of mixing valve onto the reinforcement element 1, only one pattern of the at least three patterns of mixing valve securing holes 200A, 200B, 201A, 201B, 202A, 202B, 203A, 203B, 204A, 204B, 205A, 205B, 206A, 206B is used, and that either the first use mode or the second use mode of the reinforcement element 1 is used.

Visible in FIGS. 1-3 are mixing valve indication marks 300A, 300B, 301A, 301B, 302A, 302B, 303A, 303B, 304A, 304B, 305A, 305B, 306A, 306B, provided near the mixing valve securing holes 200A, 200B, 201A, 201B, 202A, 202B, 203A, 203B, 204A, 204B, 205A, 205B, 206A, 206B. Different mixing valve indication marks may be provided to distinguish the mounting positions of different embodiments (brands) of mixing valves from each other.

Visible in FIGS. 1-3 are orientation indication marks 401, 402, are provided on the plate halves 13, 14 of the mounting plate 11. The indication marks 401, 402 may be provided to indicate the mounting orientation of the face, i.e. the back face 11B or the front face 11F, they are applied on.

With reference to FIGS. 4-7, a method for the installation of a mixing valve 2 to a mounting rail 3 is shown, the method comprising the steps of:

securing the reinforcement element 1 onto the mounting rail 3 by providing one or more male fastening elements 31, 32 that extend through a pattern of the reinforcement element securing holes 100A, 100B, 101A, 101B, 102A, 102B, 103A, 103B, 104A, 104B, 105A, 105B and into the mounting rail 3;

securing the mixing valve 2 onto the reinforcement element 1 by providing one or more male fastening elements 33, 34 that extend through a pattern of the mixing valve securing holes 200A, 200B, 201A, 201B, 202A, 202B, 203A, 203B, 204A, 204B, 205A, 205B, 206A, 206B and into the mounting rail 3.

As stated before, the mixing valve 2 may be a mixing valve of a shower and is of the type that receives at least three, here four, conduits. Such mixing valves are typically installed behind a false wall, while a frame is arranged behind said false wall, the frame supporting the mixing valve.

Figure 4:
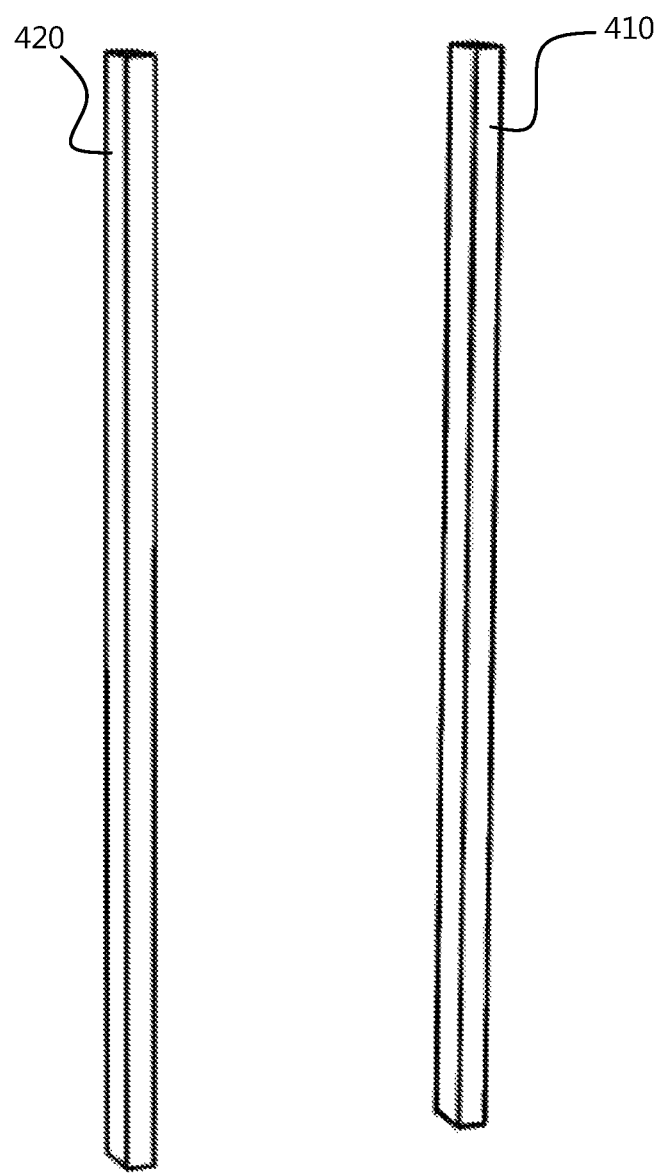
FIG. 4 schematically shows a first installation step for the securing of a mixing valve to a rail while making use of a reinforcement element according to the invention.

With reference to FIG. 4, two columns 410, 420 are shown that constitute end parts of such a frame.

Figure 5:
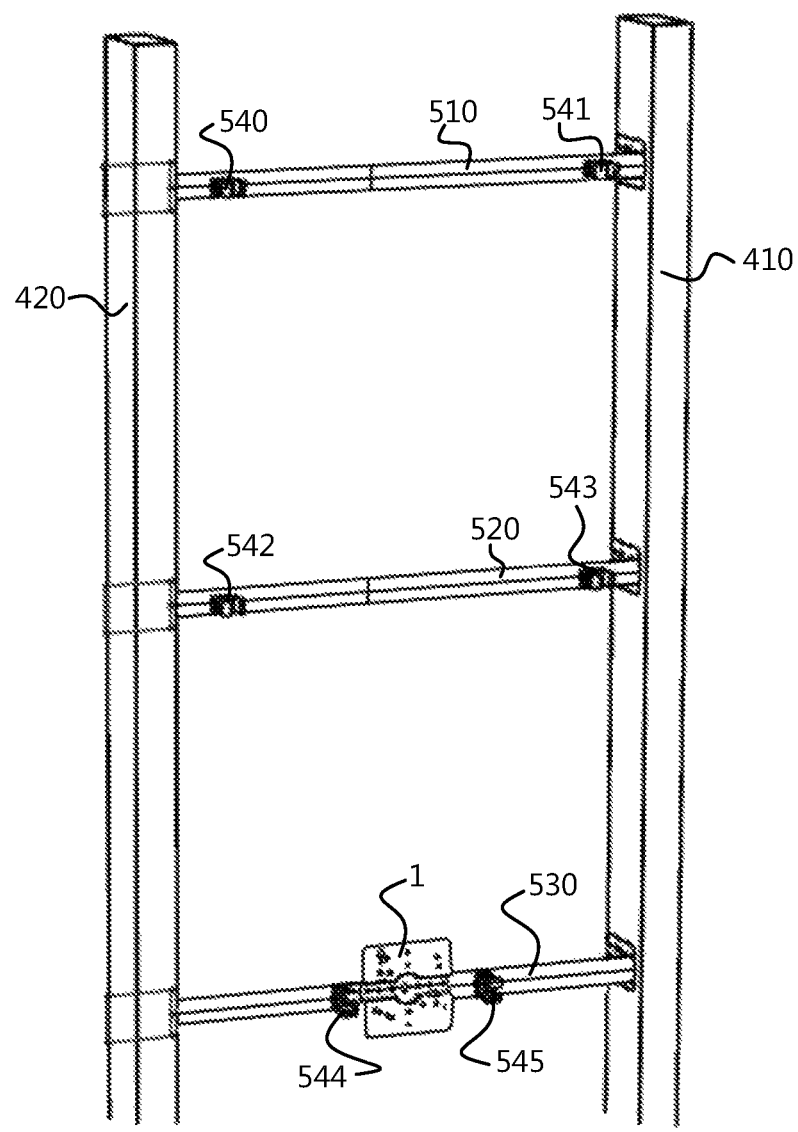
FIG. 5 schematically shows a consecutive installation step for the securing of a mixing valve to a rail while making use of a reinforcement element according to the invention.

With reference to FIG. 5, rails 510, 520, 530 are mounted in between said columns 410, 420. In the present embodiment, the rails 510, 520, 530 are telescopic rails that can easily be elongated and shortened, but this is merely a non-limiting example of a rail. In a more simple embodiment, a length of wood, e.g. a wooden plank of a length matching the distance between the columns 410, 420 may be installed between the columns 410, 420. Installed on the rails 510, 520, 530 are pipe clamps 540-545.

In presently known installations, a mixing valve is often directly mounted to rail 530.

Figure 5A:
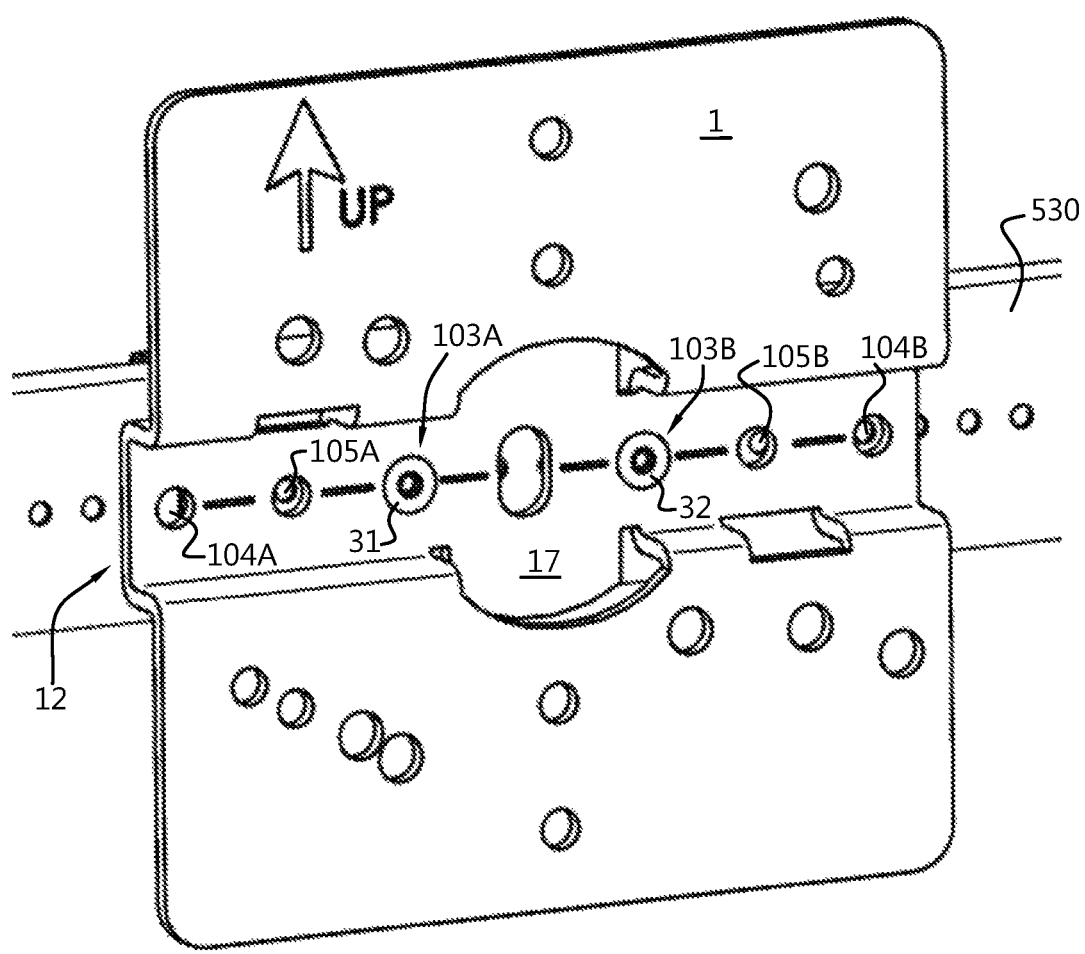
FIG. 5A schematically shows a detail of FIG. 5.

As is more clearly visible in FIG. 5A, which shows a more detailed view of the reinforcement element 1 being mounted to rail 530, according to the invention, a reinforcement element 1 is further secured on the mounting rail 530, here in a first use mode thereof, with a longitudinal axis of the centre portion being parallel to the mounting rail 530 and the bottom plate 17 of the centre portion 12 contacting the mounting rail 530. The reinforcement element 1 is secured onto the mounting rail 530 with two screws 31, 32 that extend through the fourth pattern of reinforcement element securing holes 103A, 103B and that grip into the mounting rail 530.

Figure 6:
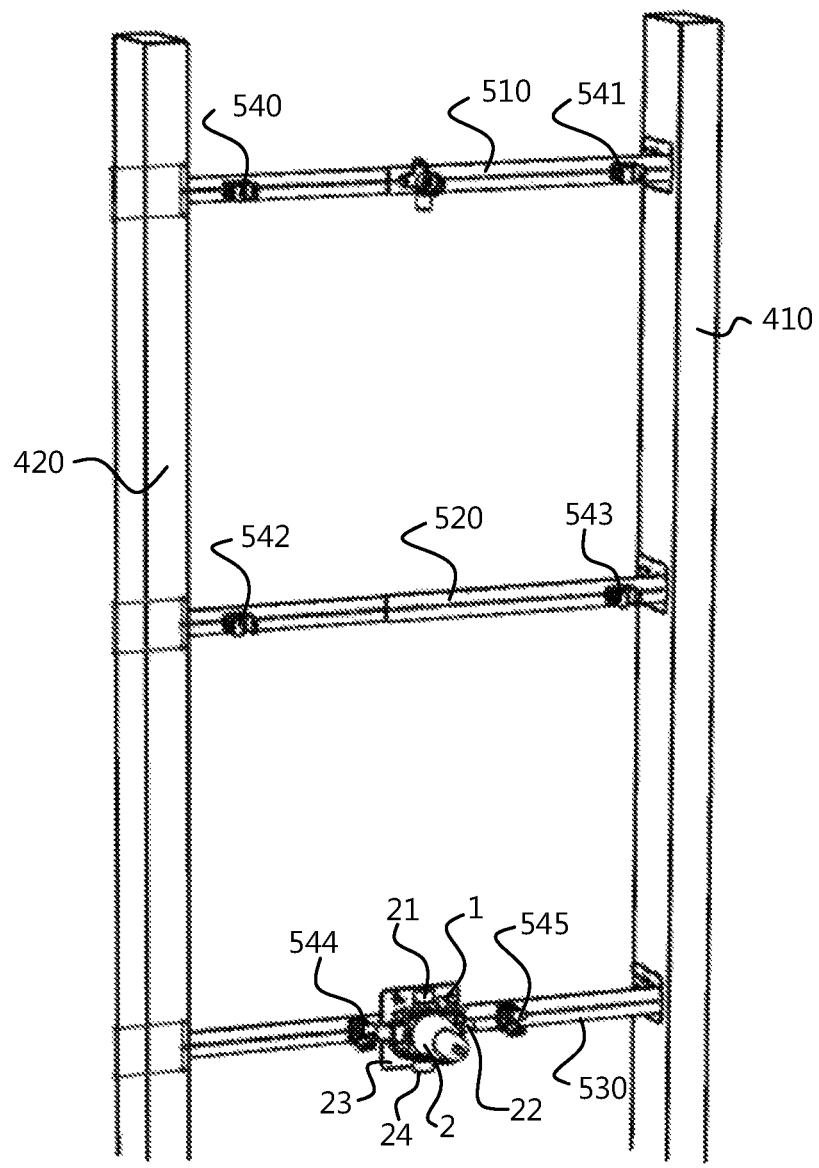
FIG. 6 schematically shows a consecutive installation step for the securing of a mixing valve to a rail while making use of a reinforcement element according to the invention.

With reference to FIG. 6, the same elements as in FIG. 5 are shown, and are numbered accordingly. Further visible in FIG. 6 is a mixing valve 2, secured onto the reinforcement element 1.

Figure 6A:
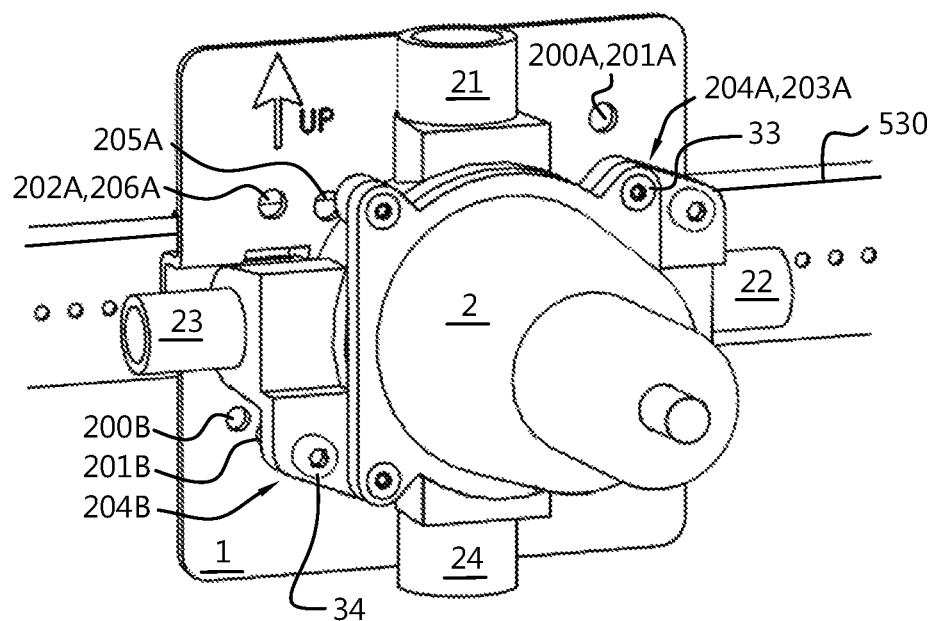
FIG. 6A schematically shows a detail of FIG. 6.

As is more clearly visible in FIG. 6A, which shows a more detailed view of the mixing valve 2 and the reinforcement valve 1 being mounted to the rail 530, the mixing valve 2 is secured to the reinforcement element 1 by screwing two screws 33, 34 into the mounting rail 530 through the fifth pattern of mixing valve securing holes 204A, 204B.

As can be seen, the body of the mixing valve 2, near pipe receiving ends 22, 23, may partially be received between the flanges of the centre portion.

In FIGS. 6 and 6A, one embodiment of a mixing valve 2 is shown, that is secured through the fifth pattern of mixing valve securing holes 204A, 204B. It will be understood that if another embodiment of a mixing valve is used, it may be installed through another pattern of mixing valve securing holes.

Figure 7:
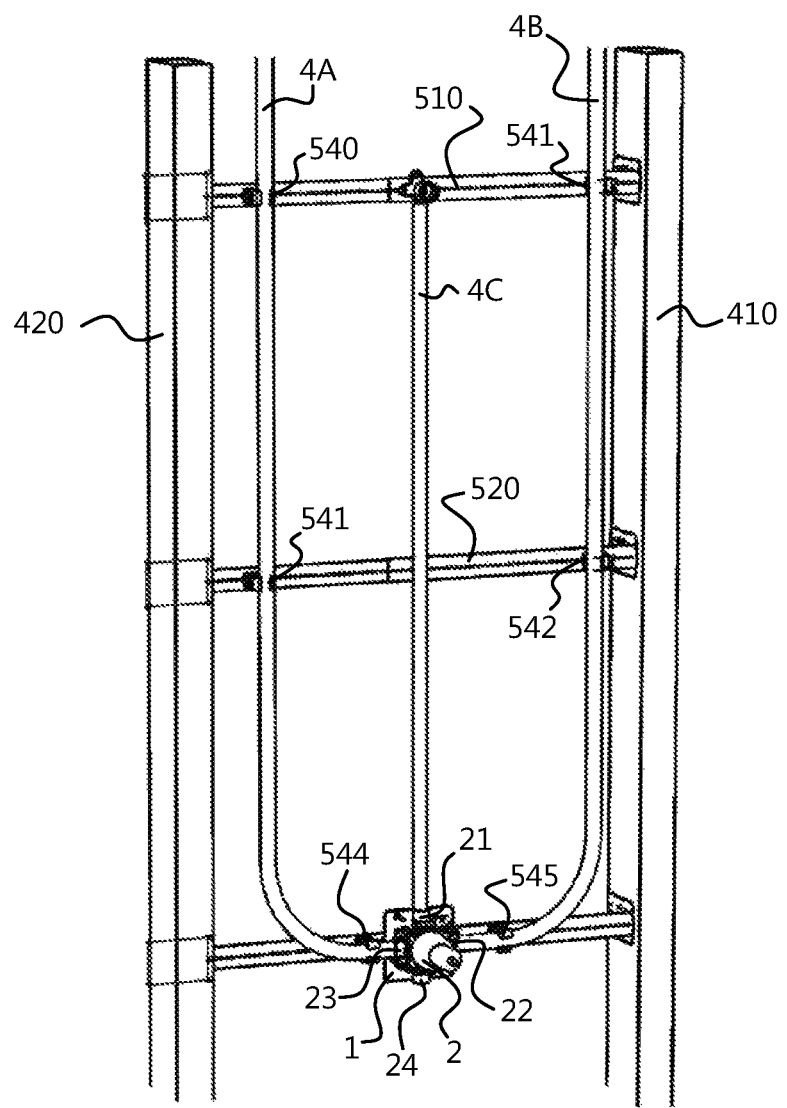
FIG. 7 schematically shows a consecutive installation step for the securing of a mixing valve to a rail while making use of a reinforcement element according to the invention.

The mixing valve 2 shown in FIGS. 6 and 6A is of the type that is able to receive four conduits at receiving ends 21, 22, 23, 24 thereof. Shown in FIG. 7 are three conduits 4A, 4B, 4C that are received by the receiving ends 21, 22, 23 of the mixing valve 2. The conduits 4A, 4B, 4C are further supported by the pipe clamps 540-545.

It is noted that, after the mixing valve 2 is installed, the space behind the rails 510, 520, 530 is essentially free of components related to the securing of the mixing valve 2 onto the rail 530.

The invention claimed is:

1. A mixing valve mounting assembly comprising:
    a mounting rail configured and adapted to be arranged in a framework in a wall; and
    a mounting plate configured and arranged to be secured to the mounting rail and to mount a mixing valve on;
    the mounting plate having a front face and a back face, and comprising:
        a central plate portion;
        two lateral plate portions flanking the central plate portion, wherein the lateral plate portions are spaced apart from and parallel to the central plate portion; and
        lateral connecting members extending from the bottom portion to the lateral plates;
        wherein the lateral connecting members and the central plate portion form a gutter with respect to the lateral plate portions,
    the mounting plate furthermore including:
        a first pattern of mounting plate securing holes provided in the central plate portion and configured to secure the central plate portion against the mounting rail in a first use mode, wherein the central plate portion engages the mounting rail with the back face;
        a second pattern of mounting plate securing holes provided in the lateral plate portions and configured to secure the lateral plate portions against the mounting rail in a second use mode, wherein the lateral plate portions engage the mounting rail with the front face;
        a plurality of mutually different patterns of valve fastening holes provided in the lateral plate portions, said respective patterns of valve fastening holes being adapted to fasten respective mutually different mixing valves onto the lateral plates in a predefined manner, such that, in the first use mode or the second use mode, the mounting plate is able to be fitted with a plurality of embodiments of mixing valves.

2. The mixing valve mounting assembly according to claim 1, wherein the first pattern of mounting plate securing holes and the second pattern of mounting plate securing holes each comprise a set of multiple collinear securing holes.

3. The mixing valve mounting assembly according to claim 2, wherein the central plate portion has an elongate shape having a longitudinal axis, and wherein the first pattern of mounting plate securing holes extends parallel or in alignment with said longitudinal axis.

4. The mixing valve mounting assembly according to claim 2, wherein the mounting rail has a row of fastening holes extending in a longitudinal direction of the mounting rail, wherein, in the first use mode, the set of collinear securing holes of the first pattern of mounting plate securing holes is aligned with said row of fastening holes, and, in the second use mode, the set of collinear securing holes of the second pattern of mounting plate securing holes is aligned with said row a fastening holes.

5. The mixing valve mounting assembly according to claim 2, wherein the set of collinear securing holes of the first pattern of mounting plate securing holes and the set of collinear securing holes of the second pattern of mounting plate securing holes extend perpendicular to each other.

6. The mixing valve mounting assembly according to claim 1, wherein the mounting rail has a width and wherein the central plate portion has a width which is smaller than the width of the mounting rail.

7. The mixing valve mounting assembly according to claim 1, wherein the lateral plate portions have respective inner edges facing each other, which inner edges each have a recess in a centre portion thereof to define with the central plate portion a receiving chamber for receiving at least a portion of a mixing valve body.

8. The mixing valve mounting assembly according to claim 1, wherein orientation indication marks are provided on both sides of the mounting plate.

9. The mixing valve mounting assembly according to claim 8, wherein the orientation indication marks are provided on one or both of the lateral plate portions of the mounting plate.

10. An assembly for mounting a mixing valve in a false wall structure, comprising:
    a frame body formed by two upright columns and at least a mounting rail mounted between the columns;
    a mounting plate secured to the mounting rail, the mounting plate having a front face and a back face, and comprising:

a central plate portion;

two lateral plate portions flanking the central plate portion, wherein the lateral plate portions are spaced apart from and parallel to the central plate portion; and lateral connecting members extending from the bottom portion to the lateral plates; wherein the lateral connecting members and the central plate portion form a gutter with respect to the lateral plate portions, wherein the central plate portion is positioned with its back face against the mounting rail and is secured to the mounting rail by providing fastening elements through a first pattern of mounting plate securing holes present in the central plate portion, or wherein the lateral plate portions are positioned with their front face against the mounting rail and is secured to the mounting rail by providing male fastening elements through a second pattern of mounting plate securing holes present in the lateral plate portions, and a mixing valve mounted to the mounting plate by selecting one of mutually different patterns of valve fastening holes provided in the lateral plate portions of the mounting plate, wherein said selected pattern of valve fastening holes mates with fastening holes in a body of the mixing valve, and male fastening elements are provided through the mating fastening holes in the mixing valve body and the mounting plate.

\* \* \* \* \*